No. 757,186. PATENTED APR. 12, 1904.
R. I. FANCHER.
APPARATUS FOR SCALDING AND WASHING FRUITS AND VEGETABLES.
APPLICATION FILED MAR. 19, 1903.
NO MODEL. 2 SHEETS—SHEET 1.

WITNESSES:
INVENTOR
Rosman I. Fancher
BY
Howard P. Denison
ATTORNEY.

No. 757,186. PATENTED APR. 12, 1904.
R. I. FANCHER.
APPARATUS FOR SCALDING AND WASHING FRUITS AND VEGETABLES.
APPLICATION FILED MAR. 19, 1903.
NO MODEL. 2 SHEETS—SHEET 2.
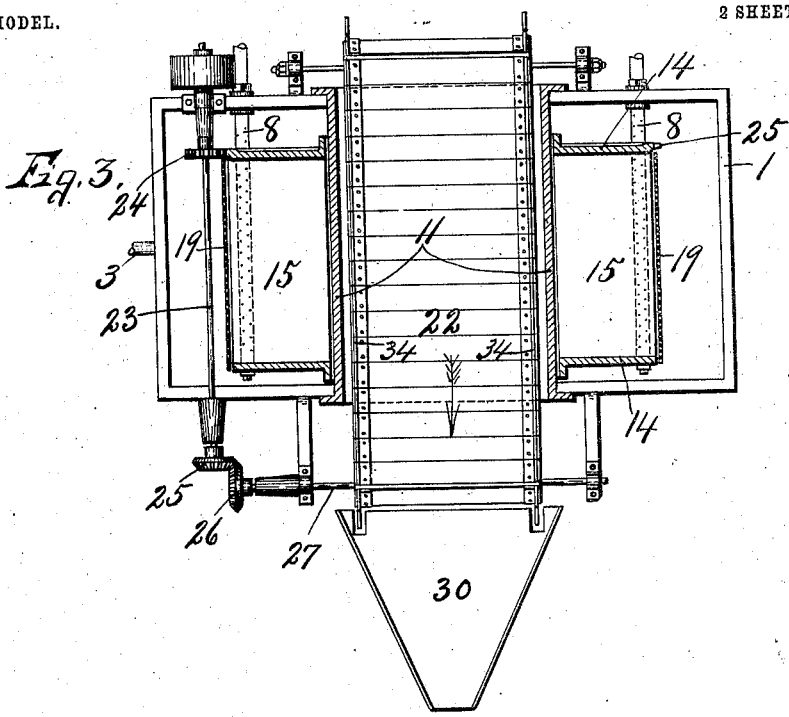
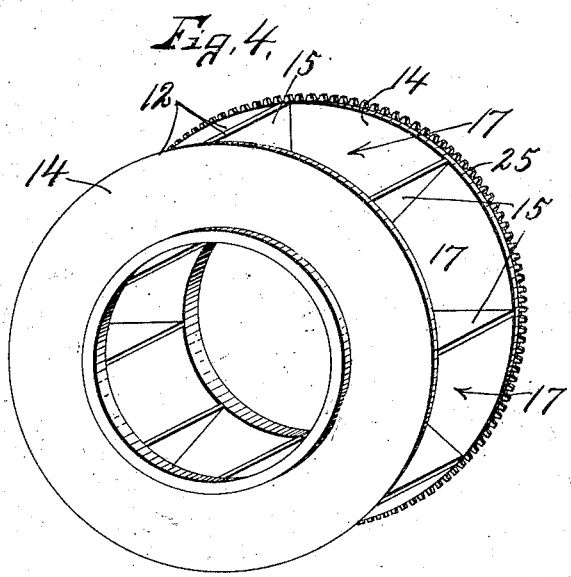
WITNESSES:
INVENTOR
Rosman I. Fancher
BY
Howard P. Denison
ATTORNEY.

No. 757,186.

Patented April 12, 1904.

UNITED STATES PATENT OFFICE.

ROSMAN I. FANCHER, OF CINCINNATI, OHIO.

APPARATUS FOR SCALDING AND WASHING FRUITS AND VEGETABLES.

SPECIFICATION forming part of Letters Patent No. 757,186, dated April 12, 1904.

Application filed March 19, 1903. Serial No. 148,482. (No model.)

*To all whom it may concern:*

Be it known that I, ROSMAN I. FANCHER, of Cincinnati, in the county of Hamilton, in the State of Ohio, have invented new and useful Improvements in Apparatus for Scalding and Washing Fruits and Vegetables, of which the following, taken in connection with the accompanying drawings, is a full, clear, and exact description.
This invention relates to improvements in apparatus for scalding and washing fruits and vegetables in which the fruit or other matter to be scalded is continuously and automatically conveyed into and out of a scalding fluid and discharged upon a suitable conveyer, by which it is conveyed to the exterior of the apparatus.

One of the objects of this invention is to produce a simple, compact, and durable machine whereby the fruit or vegetales are automatically and continuously fed to and from the scalding fluid and are thoroughly washed and uniformly scalded during their transit through the machine.
Further objects of the invention will appear in the description.

Figure 1:
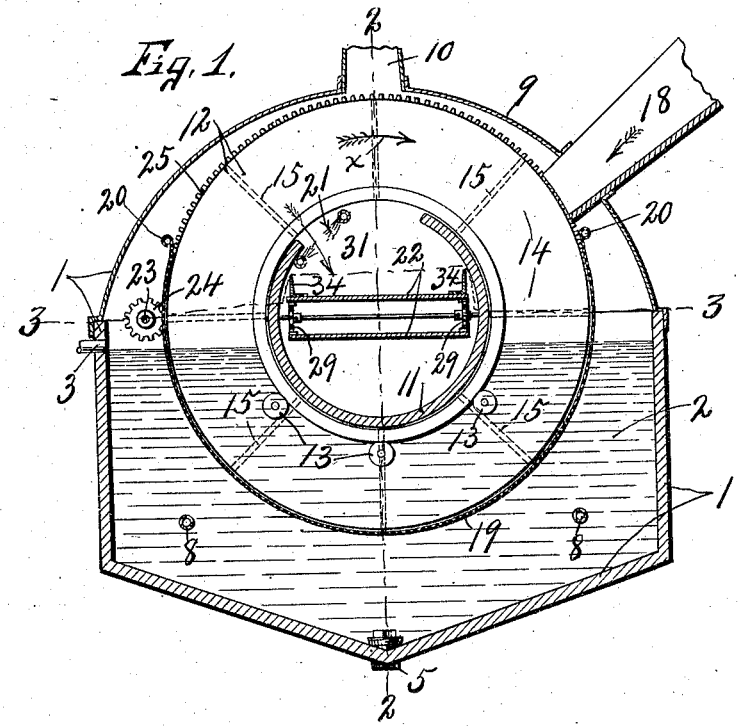
Figure 2:
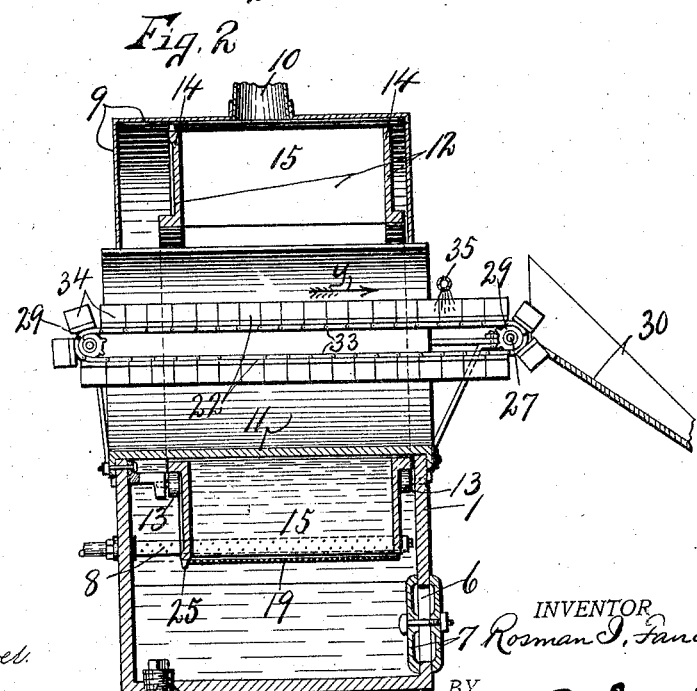

In the drawings, Figure 1 is a transverse vertical section through my improved apparatus, taken at right angles with the axis of revolution of the feeding-drum. Figs. 2 and 3 are sectional views taken, respectively, on lines 2 2 and 3 3, Fig. 1. Fig. 4 is a perspective view of the detached rotary feeding-carrier.
Similar reference characters indicate corresponding parts in all the views.

This invention consists, essentially, of a substantially rectangular vat 1, which is adapted to receive a scalding fluid, as a body of water 2, the vat being provided with an overflow-conduit 3 through one of the side walls in proximity to the upper open end of the vat for maintaining the water at a definite level. The bottom of the vat is depressed at the center and is provided with a discharge-opening 4, which is normally closed by a plug 5, whereby the liquid may be entirely drawn off when desired. One of the side walls, as the front wall, is also provided with a clean-out opening 6 in proximity to the bottom wall and normally closed by the hand-hole plates 7. The water in the vat is preferably heated to the boiling-point by steam, which is discharged into the vat through perforated steam-pipes 8, extending transversely across the interior of the vat, these steam-pipes being adapted to be connected to any source of steam-supply. (Not shown.)

The upper end of the main vat is normally closed by a hood or dome 9, which serves to inclose the interior mechanism, presently described, and also acts to properly confine the heated vapor and to maintain a substantially uniform temperature within the vat, a suitable vent 10 being provided in the upper wall of the hood to reduce the steam and vapor pressure within the inclosure.

The front and rear walls of the vat 1 and hood 9 are provided with openings, which receive a circular drum 11, extending transversely across the interior of the vat and fixed to said front and rear walls. The lower portion of this drum extends beneath the level of the liquid and forms the inner wall of a circular conduit, through which the fruit and vegetables are conveyed during the process of washing and cooking.

A revolving carrier 12 is mounted upon rollers 13 within the vat 1 and surrounds the intermediate portion of the shell 11 between the front and rear walls of the vat, the rollers 13 being mounted in fixed bearings upon the front and rear walls. The carrier 12 preferably consists of substantially parallel circular plates or rings 14, which are arranged in proximity to the front and rear walls and are united to each other at intervals by radial wings 15 for forming a series of pockets 17 between the wings and circular flanges. The inner and outer ends of these pockets are open, the fruit or vegetables being discharged into the outer ends of the pockets through a chute 18, which is disposed in an inclined plane above the axis of revolution of the carrier in such manner that the material to be treated feeds by gravity into the pockets as they are successively registered with the mouth of the chute 18 during the rotation of the carrier in the direction indicated by arrow *x*, Fig. 1. Surrounding the lower portion of the carrier, which is immersed in the scalding fluid, is a fixed screen or perforated wall 19, which closes the outer ends of the pockets and prevents the escape of the material while being carried through the scalding fluid by the carrier, this wall being of substantially the same width as the length of the pockets, and is arranged in close proximity to the periphery of the end walls 14 and outer ends of the partitions 15. This screen encircles the lower portion of the carrier, and its opposite ends terminate in planes above the axis of rotation of the carrier and are secured to the end walls of the hood 9 by transverse rods or hangers 20.

The upper portion of the shell 11 is removed for forming a lengthwise opening 21, through which the scalded fruit or other vegetables are discharged from the wings of the carrier onto an endless conveyer 22, which is arranged within and extends through the hollow shell 11 beneath the opening 21 and extends entirely through the opposite open ends of the shell 11.

The carrier 12 and conveyer 22 are driven by a rotary shaft 23, which is provided with a pinion 24, meshing with a circular rack 25 upon the periphery of the rear wall 14 of the carrier to rotate said carrier, said shaft being also provided with a beveled pinion 25, which meshes with a similar pinion 26 upon the conveyer driving-shaft 27. This conveyer consists of an endless belt or bed mounted upon sprocket-wheels 29 at the front and rear of the vat 1, the front sprocket-wheels being mounted upon the shaft 27 and serves to move the upper portion of the conveyer in the direction indicated by arrow *y*, Fig. 2, and finally discharges the scalded fruit or vegetables to an inclined chute or hopper 30. During the discharge of the material being treated from the wings of the carrier through the opening 21 and upon the conveyer 22 I preferably additionally scald the material by enveloping the same in jets of steam, which is introduced into the interior of the carrier through suitable steam-pipes 31, located in such manner as to discharge the steam against the opposite sides of the material as it is discharged from the carrier through the opening 21.

The conveyer 22 preferably consists of a series of slats arranged edge to edge and attached to the links of a conveyer-chain 33, the opposite ends of the slats being provided with flanges 34 for retaining the fruit and vegetables during their transit to the chute or hopper 30.

Before finally discharging the fruit from the conveyer it is desirable to thoroughly clean or wash the same, and I therefore provide a water-conduit 35, which is located between the front end of the shell 11 and adjacent end of the hopper 30 above the upper portion of the conveyer, so as to discharge a series of jets of water directly onto the scalded material.

Having thus described my invention, what I claim, and desire to secure by Letters Patent, is—

1. The combination with a vat adapted to contain a scalding fluid and means to heat the fluid, of a fixed hollow shell extending transversely through the vat, and provided with an opening in its upper wall, a conveyer operating lengthwise of and within the shell beneath the opening, a revolving carrier movable through the scalding fluid, means to discharge the material to be scalded onto the carrier, said carrier discharging the scalded material through the opening in the shell and onto the conveyer.

2. In combination with a vat, means to introduce steam into the vat, a revolving carrier within the vat, a fixed screen encircling the lower portion of the carrier, means to discharge the material to be scalded onto the carrier and a conveyer operating axially of and within the carrier, said carrier being adapted to discharge the scalded material onto the conveyer.

3. In combination with a vat adapted to contain a scalding liquid, means to heat the liquid, inner and outer fixed concentric circular walls within the vat and dipping into the liquid, the inner wall being imperforate, a revolving carrier movable between said walls for carrying the material to be scalded through the scalding fluid, and a conveyer operating axially of and within the carrier for receiving the scalded material from the carrier.

4. In combination with a vat adapted to contain a scalding fluid, means to heat the fluid, inner and outer concentric circular walls within the vat and dipping into the fluid, the outer wall being perforated and the inner wall being provided with an opening in its top, a rotary carrier movable between said walls and provided with a series of pockets having their inner ends open and successively registering with the opening in the inner concentric wall whereby the scalding fluid is discharged automatically within said inner wall and means to feed the material to be treated into the pockets.

5. In a scalding and washing apparatus for fruits and vegetables, the combination with a vat adapted to contain a scalding fluid and means to heat the fluid, of a rotary carrier having a series of pockets movable through the liquid, said pockets being open at their inner and outer ends, a perforated wall closing the outer open ends of the pockets which are immersed in the liquid, an imperforate inner wall closing the inner ends of the pockets which are immersed in the liquid, said inner wall being open at the top and the carrier discharging the scalded material through said opening and a conveyer operating axially of and within the carrier beneath said opening for receiving the material discharged from the carrier through the opening and means to actuate the conveyer.

6. In an apparatus for scalding and washing fruits and vegetables, the combination with a vat adapted to contain a scalding fluid and means to heat the fluid, of a rotary carrier having a circular central opening and a series of pockets communicating with the opening, said pockets being open at their inner and outer ends and movable through the scalding fluid for conveying the material to be treated therethrough, a closure for the outer ends of the immersed pockets and a conveyer operating in the central opening of the carrier, the several pockets of the carrier successively discharging at their inner ends onto the conveyer and means to actuate the conveyer.

7. An apparatus for scalding and washing fruits and vegetables comprising a vat adapted to contain a scalding fluid, means to heat the fluid, a rotary carrier within the vat having a central opening and a series of pockets surrounding the opening and open at their inner and outer ends, means for revolving the carrier, additional means for discharging the material to be treated into the open outer ends of the pockets as the carrier is revolved, a closure for the outer ends of the immersed pockets and a conveyer operating axially of and within the central opening of the carrier, the several pockets of the carrier discharging successively from their inner ends onto the conveyer.

8. In combination with a vat adapted to contain a scalding fluid and means to heat the fluid, a rotary carrier having a central opening and a series of pockets surrounding the opening and open at their inner and outer ends, means to rotate the carrier, means to feed the material to be treated into the outer ends of the pockets during the rotation of the carrier, a closure for the outer ends of the immersed pockets, a conveyer operating through the central opening, means to actuate the conveyer, said carrier being adapted to discharge the scalded material through the inner end of the pockets onto the conveyer and a perforated steam-pipe arranged within the central opening of the carrier for discharging steam against the scalded material as it is discharged from the pockets onto the conveyer.

9. An apparatus for scalding and washing fruits and vegetables comprising a vat adapted to contain a scalding fluid, means for heating the fluid, a rotary carrier having a central opening and a series of pockets movable through the fluid, a perforated wall covering the outer ends of the pockets which are immersed in the liquid, a second concentric wall covering the inner ends of the pockets and open at the top above the liquid-level, a conveyer operating within the central opening of the carrier, said carrier being adapted to discharge the scalded material from the inner ends of the pockets through the opening in the inner wall and upon the conveyer, means to actuate the conveyer and a water-pipe located above the conveyer and adapted to discharge the water upon the material while being conveyed from the carrier.

10. An apparatus for scalding and washing fruits and vegetables comprising a vat adapted to contain a scalding fluid, steam-pipes projecting into the interior of the vat for heating the fluid, a rotary carrier within the vat having a central opening and a series of pockets surrounding said opening and communicating therewith, inner and outer concentric walls covering the inner and outer ends of the pockets which are immersed in the liquid, the inner wall having an opening in its top to receive the scalded material discharged from the inner ends of the pockets, means to feed the material to be treated into the outer ends of the pockets during the rotation of the carrier, a conveyer operating within the central opening of the carrier to receive the scalded material, a perforated steam-pipe discharging steam against the material discharged from the inner ends of the pockets and a water-pipe discharging onto the material in the conveyer.

In witness whereof I have hereunto set my hand this 26th day of January, 1903.

ROSMAN I. FANCHER.

Witnesses:
H. E. CHASE,
MILDRED M. NOTT.